(12) United States Patent
Matsuo

(10) Patent No.: US 7,672,334 B2
(45) Date of Patent: Mar. 2, 2010

(54) WIRELESS COMMUNICATION APPARATUS AND TRANSMISSION CONTROL METHOD

(75) Inventor: Ryoko Matsuo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 11/752,717

(22) Filed: May 23, 2007

(65) Prior Publication Data

US 2007/0280130 A1 Dec. 6, 2007

(30) Foreign Application Priority Data

May 30, 2006 (JP) ............................. 2006-150540

(51) Int. Cl.
*H04W 4/00* (2006.01)
(52) U.S. Cl. ...................... 370/470; 370/338
(58) Field of Classification Search ................ 370/470, 370/471, 338, 252, 235, 236
See application file for complete search history.

(56) References Cited

U.S. PATENT DOCUMENTS

| | | | | |
|---|---|---|---|---|
| 2006/0098687 A1* | 5/2006 | Singh et al. | .................. | 370/470 |
| 2006/0209889 A1* | 9/2006 | Tamai | ......................... | 370/468 |
| 2006/0239298 A1* | 10/2006 | Townsley et al. | ............ | 370/470 |
| 2007/0133604 A1* | 6/2007 | Nelson et al. | ............... | 370/470 |

FOREIGN PATENT DOCUMENTS

| | | |
|---|---|---|
| JP | 2001-217896 | 8/2001 |
| JP | 2002-101151 | 4/2002 |
| JP | 2004-260658 | 9/2004 |
| JP | 3719993 | 9/2005 |

OTHER PUBLICATIONS

U.S. Appl. No. 11/684,244, filed Mar. 9, 2007, Ryoko Matsuo et al.
Mathieu Lacage, et al., "IEEE 802.11 Rate Adaptation: A Practical Approach", Proc. Of ACM MSWiM, 2004, 9 Pages.
John C. Bicket, "Bit-rate Selection in Wireless Networks", M.S. Thesis, MIT, 2005, 11 Pages.

* cited by examiner

*Primary Examiner*—Brian D Nguyen
(74) *Attorney, Agent, or Firm*—Oblon, Spivak, McClelland, Maier & Neustadt, L.L.P.

(57) ABSTRACT

A wireless communication apparatus includes a memory to store reference data including transmission rates usable for transmission of an aggregated frame including frames and reference frame lengths of the aggregated frame corresponding to the transmission rates, respectively, a throughput obtained with one of the transmission rates and a reference frame length of the reference frame lengths which corresponds to the one of the transmission rates is higher than any throughputs obtained with any frame length at another transmission rate lower than the one of the transmission rates, selects a trial transmission rate and corresponding reference frame length as a trial frame length, sets the trial transmission rate and the trial frame length, with which communication is determined to be possible by transmitting a trial aggregated frame, to initial/maximum values of a transmission rate for transmitting the aggregated frame and a frame length of the aggregated frame, respectively.

20 Claims, 8 Drawing Sheets

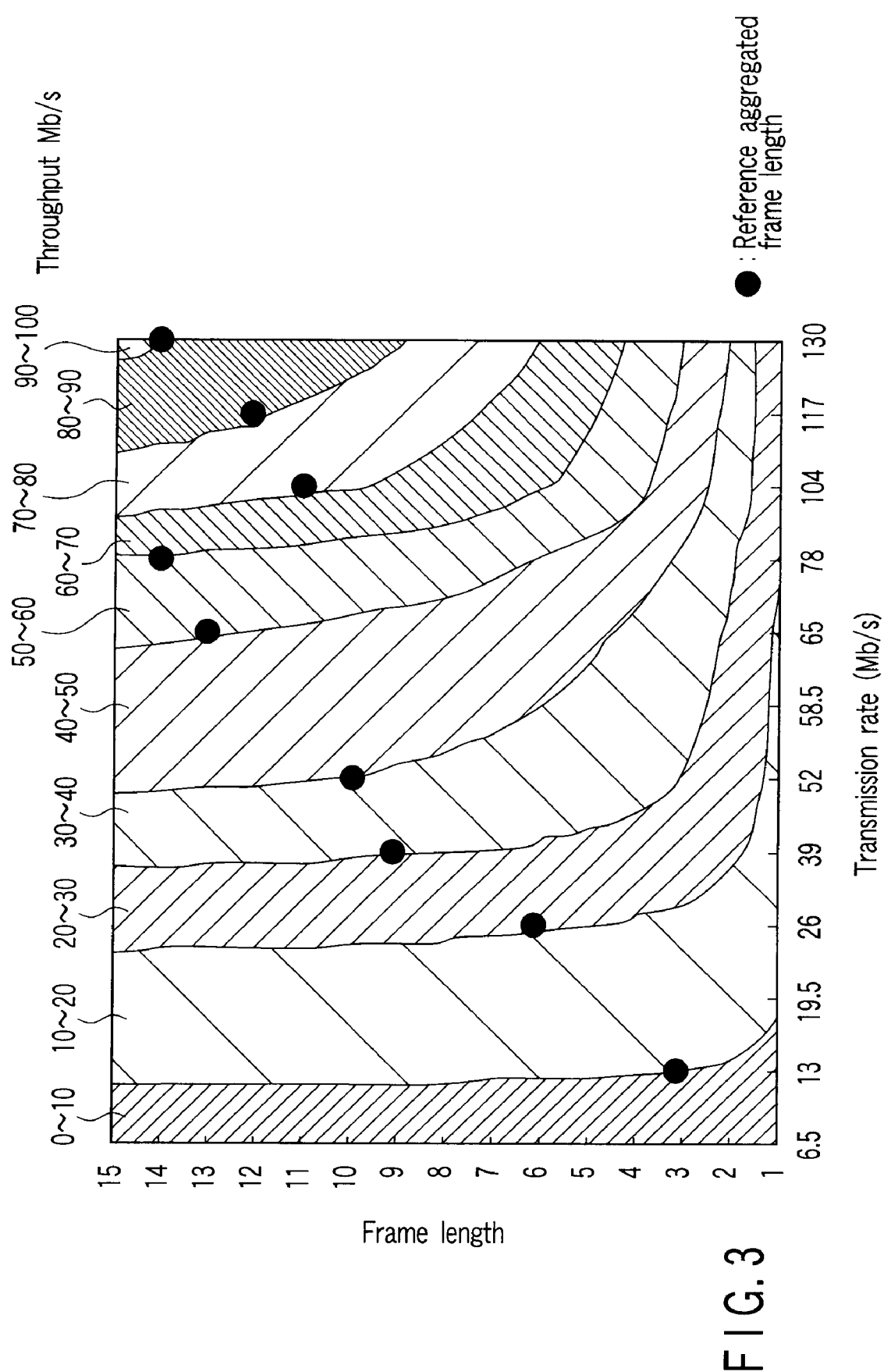
F I G. 3

| Throughput Mb/s \ Transmission rate Mb/s | 6.5 | 13 | 19.5 | 26 | 39 | 52 | 58.5 | 65 | 78 | 104 |
|---|---|---|---|---|---|---|---|---|---|---|
| 90-100 | | | | | | | | | | |
| 80-90 | | | | | | | | | | |
| 70-80 | | | | | | | | | | | 5 |
| 60-70 | | | | | | | | | | 6 | |
| 50-60 | | | | | | | 9 | | | |
| 40-50 | | | | | | 4 | | | | |
| 30-40 | | | | | 4 | | | | | |
| 20-30 | | | | 3 | | | | | | |
| 10-20 | | 2 | | | | | | | | |
| 0-10 | | | | | | | | | | |

FIG. 4

| Throughput Mb/s \ Transmission rate Mb/s | 6.5 | 13 | 19.5 | 26 | 39 | 52 | 58.5 | 65 | 78 | 104 |
|---|---|---|---|---|---|---|---|---|---|---|
| 90-100 | | | | | | | | | | |
| 80-90 | | | | | | | | | | 8 |
| 70-80 | | | | | | | | | | (5) |
| 60-70 | | | | | | | | | (6) | 3 |
| 50-60 | | | | | | | (9) | 5 | 3 | 2 |
| 40-50 | | | | | | (4) | 3 | 2 | 2 | |
| 30-40 | | | | | (4) | 2 | 2 | 1 | 1 | 1 |
| 20-30 | | | | (3) | 1 | 1 | 1 | | | |
| 10-20 | | (2) | 1 | 1 | | | | | | |
| 0-10 | 1 | 1 | | | | | | | | |

FIG. 7

WIRELESS COMMUNICATION APPARATUS AND TRANSMISSION CONTROL METHOD

CROSS-REFERENCE TO RELATED APPLICATIONS

This application is based upon and claims the benefit of priority from prior Japanese Patent Application No. 2006-150540, filed May 30, 2006, the entire contents of which are incorporated herein by reference.

BACKGROUND OF THE INVENTION

1. Field of the Invention

The present invention relates to a wireless communication apparatus.

2. Description of the Related Art

A wireless system uses a technique of transmitting a plurality of frames upon aggregating them to improve communication efficiency. For example, Task Group n (TGn), whose standardization has been under way via IEEE801.11, has proposed an aggregation technique of aggregating and transmitting a plurality of frames. This technique of aggregating and transmitting a plurality of frames can reduce overheads such as physical (PHY) and MAC layer headers accompanying each frame, which are required at the time of transmission and reception of frames, and the interval between frames.

On the other hand, as the frame length increases excessively, the wireless channel state estimated at the head of a frame differs from the state at the rear half portion of the frame, resulting in an error. That is, a proper frame length depends on the state of the wireless channel.

Existing IEEE802.11a/b/g also has studied an algorithm for link adaptation for controlling a transmission rate in accordance with a wireless channel. A conventional algorithm sets the initial value of a transmission rate to the minimum or maximum rate, and then starts control (M. Lacage, M. H. Manshaei and T. Turletti, "see IEEE802.11 rate adaptation: a practical approach", Proc. Of ACM MSWiM, 2004, and reference 2: k J. C. Bicket, "Bit-rate Selection in Wireless Networks", M. S. Thesis, MIT, 2005).

Consider admission control. According to conventional admission control, whether a new terminal can be accommodated is determined from the throughput (channel occupation ratio) at the current transmission rate of an existing terminal. In addition, JP-A 2003-251791 (KOKAI) discloses a method in which a terminal sends all possible transmission rates to an AP in advance in consideration of the application of a wireless LAN to home AV devices, and then performs stable transmission/reception upon setting the transmission rate to a relatively low rate if the channel capacity is large enough. In this method, when assigning a channel to a new terminal, the AP determines whether to accept a request from the new terminal, assuming that transmission/reception is performed at the maximum transmission rate applied by an existing terminal at the time of association. In this case, the maximum value of a usable transmission rate changes depending on a wireless channel state. However, there is no description about how to obtain the maximum value of a transmission rate in JP-A 2003-251791 (KOKAI).

Assume that an initial transmission rate is to be determined at the start of communication or the maximum transmission rate of each terminal in admission control is to be obtained. In this case, in consideration of the aggregation technique in IEEE802.11n which aggregates a plurality of frames and transmits the aggregated frame, depending on the number of frames to be aggregated, even if a transmission rate x is lower than a transmission rate y, the throughput at the transmission rate x may become higher than that at the transmission rate y. That is, in consideration of the aggregation technique, the assumption that the higher the transmission rate, the better does not always hold. It is therefore necessary to check the frame lengths (frame counts) to which frames can be aggregated at the respective transmission rates through all the transmission rates and compare them with each other.

As described above, according to IEEE802.11n, aggregation is performed to transmit an aggregated frame including a plurality of frames. In aggregation, a channel state is estimated from the preamble of the head of a frame, and an aggregated data frame is decoded following the preamble by using the estimated value. For this reason, a channel state corresponding to frames of the second half portion of the aggregated frame differs from the channel state at the time of estimation from the preamble, and hence errors generally tend to occur in the frames of the second half portion of the aggregated frame. The number of frames included in the aggregated frame depends on various factors, e.g., a transmission rate, a wireless channel state, and the type of decoding or channel tracking to be performed on the receiving side.

In general, the number of frames included in an aggregated frame at a high transmission rate, in particular, is smaller than that at a low transmission rate, it is not necessarily appropriate to assume that the higher the transmission rate, the higher the throughput. Under these circumstances, in consideration of both a transmission rate and the number of frames in an aggregated frame, it is necessary to select a combination of transmission rate and frame count which can obtain a high throughput. However, no studies have been made on a technique for selecting both a transmission rate and the number of frames in an aggregated frame from the viewpoint of throughput.

BRIEF SUMMARY OF THE INVENTION

According to embodiments of the present invention, a wireless communication apparatus includes:

a memory to store reference data including a plurality of transmission rates usable for transmission of an aggregated frame including a plurality of frames and a plurality of reference frame lengths of the aggregated frame corresponding to the transmission rates, respectively, a throughput obtained with one of the transmission rates and a reference frame length of the reference frame lengths which corresponds to the one of the transmission rates is higher than any throughputs obtained with any frame length at another transmission rate lower than the one of the transmission rates;

a selecting unit configured to select one or more trial transmission rates among the transmission rates and one or more trial frame lengths among the reference frame lengths and frame lengths other than the reference frame lengths;

a transmission unit configured to transmit a trial aggregated frame with one of the trial transmission rates selected by the selecting unit, a frame length of the trial aggregated frame corresponding to one of the trial frame lengths selected by the selecting unit;

a reception unit configured to receive a response corresponding to the trial aggregated frame transmitted;

a determining unit configured to determine whether communication with the one of the trial transmission rates and the one of the trial frame lengths is possible or not, based on the response received; and a control unit configured to set the one of the trial transmission rates and the one of the trial frame lengths, with which the communication is determined to be possible, to initial/maximum values of a transmission rate for transmitting the aggregated frame and a frame length of the aggregated frame, respectively.

BRIEF DESCRIPTION OF THE SEVERAL VIEWS OF THE DRAWING

FIG. 3 is a graph showing another example of throughput characteristics with respect to transmission rates and aggregated frame lengths, and reference aggregated frame lengths with respect to the respective transmission rates;

FIG. 4 is a view of an example of a table showing the relationship between transmission rates, aggregated frame lengths, and throughputs;

FIG. 7 is a view of another example of a table showing the relationship between transmission rates, aggregated frame lengths, and throughputs;

DETAILED DESCRIPTION OF THE INVENTION

The embodiments of the present invention will be described below with reference to the views of the accompanying drawing.

First Embodiment

Figure 1:
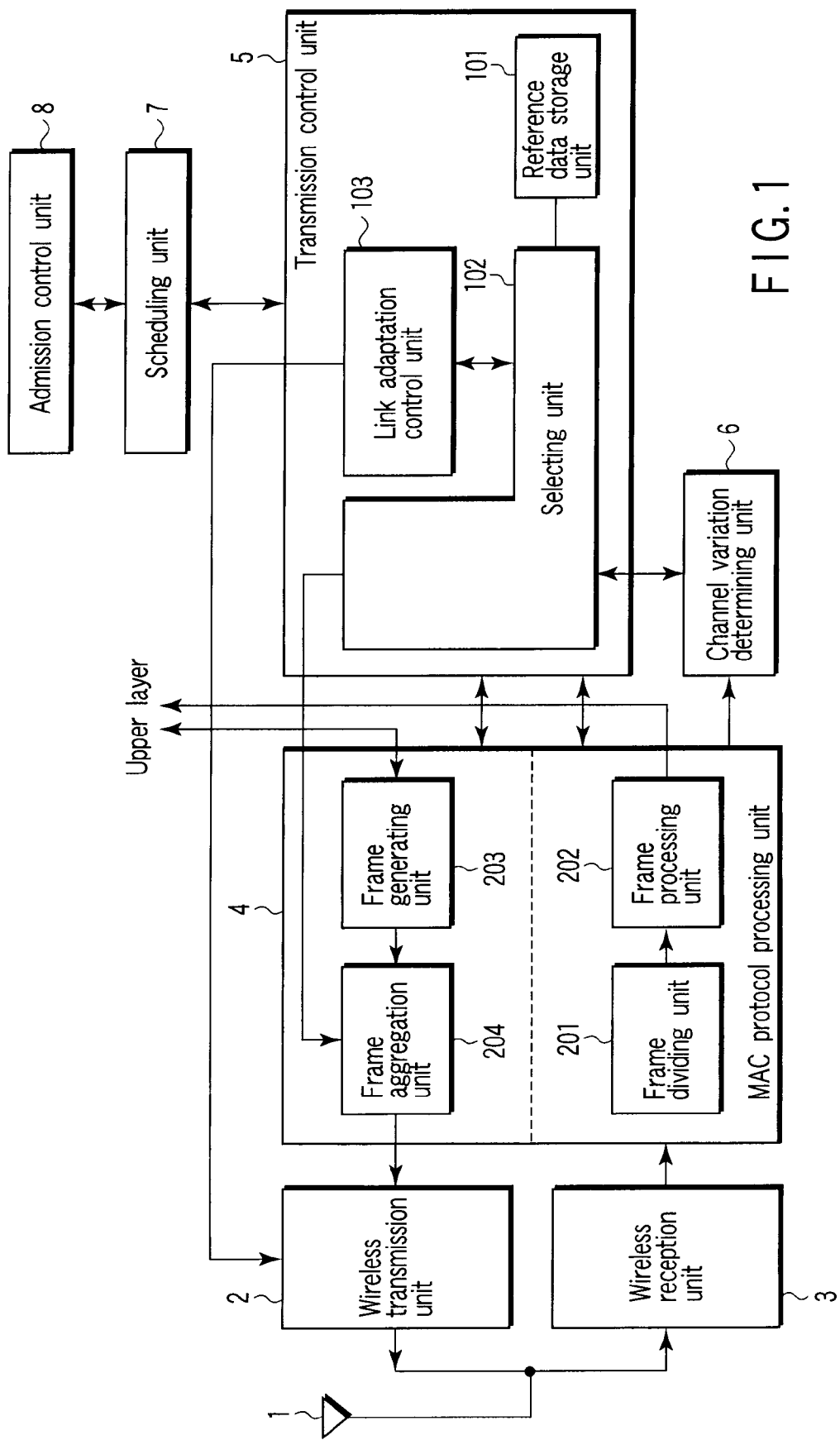
FIG. 1 is a block diagram showing an example of the arrangement of a wireless communication apparatus according to the first embodiment.

A wireless communication apparatus in FIG. 1 includes at least an antenna 1, wireless transmission unit 2, wireless reception unit 3, MAC protocol processing unit 4, transmission control unit 5, channel variation determining unit 6, scheduling unit 7, and admission control unit 8.

The MAC protocol processing unit 4 includes a frame dividing unit 201, frame processing unit 202, frame generating unit 203, and frame aggregation unit 204. The transmission control unit 5 includes a reference data storage unit 101, selecting unit 102, and link adaptation control unit 103.

An outline of the operation of the wireless communication apparatus in FIG. 1 at the time of signal transmission will be described first.

The admission control unit 8 performs a series of procedures for inquiring whether it is possible to communicate with a desired communication apparatus such as an access point (AP), e.g., notifying the communication apparatus of a usable transmission rate. If there is an available channel in the communication apparatus and communication can be performed with the communication apparatus, the scheduling unit 7 performs a series of procedures, e.g., assignment of the available channel, with the communication apparatus. When frames are to be transmitted to the communication apparatus after the above procedures, first of all, the frame generating unit 203 generates a frame including data output from the upper layer. The frame aggregation unit 204 collects frames up to the number of frames which can be aggregated on the basis of the frame length (or the frame count) notified from the selecting unit 102, and generates an aggregated frame including one or a plurality of frames. The generated aggregated frame is output to the wireless transmission unit 2 upon a series of access control operations. The wireless transmission unit 2 transmits the input aggregated frame through antenna 1 upon performing processing such as coding processing, modulation processing, D/A conversion, and frequency conversion to a predetermined frequency.

An outline of the operation of the wireless communication apparatus in FIG. 1 at the time of signal reception will be described. The wireless reception unit 3 performs processing such as frequency conversion to baseband, A/D conversion, demodulation processing, and decoding processing, and outputs the resultant reception data including the aggregated frame to the MAC protocol processing unit 4. The frame dividing unit 201 of the MAC protocol processing unit 4 extracts a data portion by removing a header portion from the input reception data (aggregated frame). The frame processing unit 202 performs a CRC check and retransmission processing by using the extracted data portion.

The received frame may be either a data frame transmitted from the communication partner of the wireless communication apparatus or a reception ACK/NAK response transmitted from the communication partner in response to the data frame transmitted from the wireless communication apparatus to the communication partner. For example, in a wireless LAN system, the receiving side which has received a data frame notifies the transmitting side of the success/failure of reception of the data frame by transmitting a response such as an ACK or a Block Ack. If the received data is a data frame, the frame processing unit 202 outputs the payload in the data frame to the upper layer. If the received data is a response (an ACK/NAK to each frame in the aggregated frame or a Block ACK to the overall aggregated frame) to the previously transmitted data frame, the frame processing unit 202 performs retransmission processing on the basis of the response, and notifies the channel variation determining unit 6 of the response.

The channel variation determining unit 6 calculates an error rate with respect to the overall aggregated frame or each frame in the aggregated frame by using responses such as an ACK/NAK to each frame in the aggregated frame or a Block ACK to the overall aggregated frame, and compares the calculated result with an error rate (threshold error rate) as a predetermined threshold, thereby determining whether it is possible to perform communication at the current transmission rate and with the current aggregated frame length. If, for example, the calculated error rate is less than the threshold error rate, the channel variation determining unit 6 determines that it is possible to perform communication at the current transmission rate and with the current aggregated frame length. If the calculated error rate is equal to or more than the threshold error rate, the channel variation determining unit 6 determines that it is impossible to perform communication at the current transmission rate and with the current aggregated frame length.

The error rate calculated by the channel variation determining unit 6 will be briefly described below. Assume that an aggregated frame includes 10 frames. In this case, when ACKs are obtained with respect to all the 10 transmitted frames, the error rate of the overall aggregated frame is 0%. If ACKs are obtained with respect to only six frames out of the 10 frames, the error rate of the overall aggregated frame is 40%.

As described above, the error rate of an overall aggregated frame can be obtained as the ratio of the number of frames to which no ACK response could be obtained to the number of frames in the transmitted aggregated frame. In addition, when an aggregated frame including 10 frames is transmitted a plurality of number of times, the error rate of the overall aggregated frame may be the average value of the error rates of the respective aggregated frames.

Furthermore, when an aggregated frame including 10 frames is transmitted a plurality of number of times, the error rate of each frame in the aggregated frame can be obtained from the number of times no ACK response could be obtained with respect to the frame, of the number of times the aggregated frame was transmitted. The error rate of the aggregated frame may be the average value of the error rates of the respective frames in the aggregated frame.

Note that the channel variation determining unit 6 may use the reception power value (RSSI) obtained by the wireless reception unit 3 at the time of signal reception, a channel estimation result, or the like instead of the above error rate to determine whether it is possible to perform communication at the current transmission rate and with the current aggregated frame length. For example, the channel variation determining unit 6 compares the RSSI or the channel estimation result with a predetermined threshold to determine whether it is possible to perform communication at the current transmission rate and with the current aggregated frame length. Alternatively, the channel variation determining unit 6 may determine whether it is possible to perform communication at the current transmission rate and with the current aggregated frame length, on the basis of the time required to receive a response to a data frame after it is transmitted or whether a response is received within a predetermined time.

Assume that in this case, the channel variation determining unit 6 compares the error rate calculated when a response to a transmitted aggregated frame is received with a predetermined threshold error rate to determine whether it is possible to perform communication at the current transmission rate and with the current aggregated frame length.

If the calculated error rate is lower than the threshold error rate (or equal to or less than the threshold error rate), it is possible to perform communication at the current transmission rate and with the current aggregated frame length. If the calculated error rate is equal to or more than the threshold error rate (or higher than the threshold error rate), it is not appropriate to perform communication at the current transmission rate and with the current aggregated frame length. It is therefore necessary to adjust the transmission rate or the aggregated frame length.

The selecting unit 102 selects initial values for a transmission rate and an aggregated frame length (count) which are suitable for communication. In particular, the selecting unit 102 sets a transmission rate and an aggregated frame length (count) at the start of communication and determines a maximum transmission rate required at the time of admission control.

It is conceivable to use the transmission rates and the aggregated frame count, which are determined as initial values/maximum values by the selecting unit 102, as initial values in link adaptation control by the link adaptation control unit 103 or as the maximum value of throughput of the wireless communication apparatus when admission control is performed between itself and an access point in a wireless LAN.

In general, the aggregated frame length decreases more at a high transmission rate than at a low transmission rate. For this reason, the selecting unit 102 selects a transmission rate and an aggregated frame length in consideration of throughput.

The processing operation of the selecting unit 102 will be described next.

Figure 2:
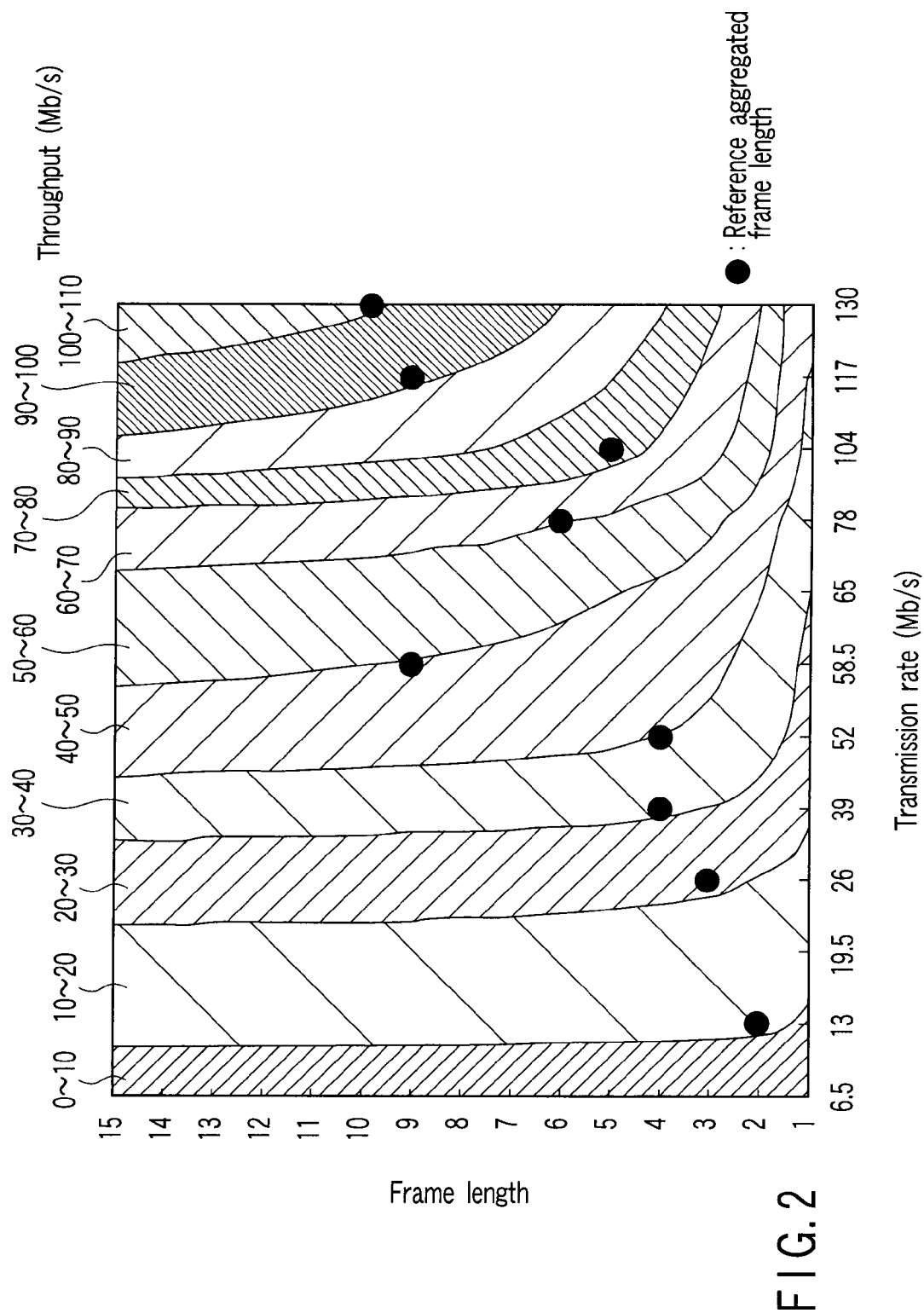
FIG. 2 is a graph showing an example of throughput characteristics with respect to transmission rates and aggregated frame lengths, and reference aggregated frame lengths with respect to the respective transmission rates.

FIG. 2 shows 12 transmission rates (Mb/s) on the abscissa, and 15 aggregated frame lengths on the ordinate. Each aggregated frame length is represented by the number of fixed-length frames each having 1,024 bytes. Note that a frame length is not limited to this, and may be represented, for example, every 1,000 bytes. In addition, referring to FIG. 2, throughputs are grouped every 10 Mb/s. Obviously, however, the manner of grouping is not limited to this, and throughputs may be grouped in arbitrary size.

Referring to FIG. 2, each bullet represents a reference aggregated frame length at a corresponding transmission rate. The reference aggregated frame length at each transmission rate represents an aggregated frame length by which the highest throughput can be obtained among the throughputs obtained by any aggregated frame lengths at transmission rates lower than the corresponding transmission rate. Note that referring to FIG. 2, each reference aggregated frame length is represented by the number of frames included in an aggregated frame. According to the throughput characteristics with respect to the transmission rates and the aggregated frame lengths, reference aggregated frame lengths like those described above do not always exist with respect to all the transmission rates in FIG. 2. For example, referring to FIG. 2, there is no reference aggregated frame length like that described above with respect to a transmission rate of 65 Mb/s. If it is possible to perform communication with a reference aggregated frame length or more at a given transmission rate, a throughput higher than the throughput obtained with the transmission rate and the reference aggregated frame length cannot be obtained at a lower transmission rate no matter how the aggregated frame length is increased.

For example, referring to FIG. 2, when communication is to be performed at a transmission rate of 78 Mb/s and with a reference aggregated frame length=5 frames, the throughput becomes 60 to 70 Mb/s. When communication is to be performed at a transmission rate of 65 Mb/s lower than the above transmission rate by one level, the throughput becomes 50 to 60 Mb/s even if the aggregated frame length is 15 frames. That is, this throughput is lower than that obtained with the above transmission rate, 78 Mb/s, and the reference aggregated frame length.

If the frame length of an aggregated frame which can be communicated at a given transmission rate is equal to or more than the reference aggregated frame length, since the apparatus cannot obtain any throughput higher than the current throughput even by performing communication at any transmission rate lower than the given transmission rate, there is no need to perform any trial communication at the low transmission rate.

Assume that the wireless communication apparatus in FIG. 1 performs trial communication at a plurality of different transmission rates which the apparatus has, starting from the high transmission rate. In this case, if the apparatus can perform communication with a reference aggregated frame length at a given transmission rate, the apparatus sets the transmission rate and the reference aggregated frame length as initial values or maximum values for subsequent communication.

FIG. 3 shows a case wherein one frame is a fixed-length frame with 512 bytes, and the aggregated frame length is represented by the number of fixed-length frames each having 512 bytes. The maximum aggregated frame length is 15 frames.

Like FIG. 2, FIG. 3 shows 12 transmission rates (Mb/s) on the abscissa, and 15 aggregated frame lengths on the ordinate. The throughputs are grouped every 10 Mb/s. In addition, each bullet represents a reference aggregated frame length at a corresponding transmission rate.

The frame length in the case shown in FIG. 3 in which one frame consists of 512 bytes is half that in the case shown in FIG. 2 in which one frame consists of 1,024 bytes. Basically, therefore, in this case, the number of frames required to achieve a throughput at the same level as that in the case shown in FIG. 2 is double the number of frames therein, and hence the reference aggregated frame count is double that in the case shown in FIG. 2. In a region where the transmission rate is high, in particular, this relationship does not hold. This is because, according to the proposal from IEEE802.11 TGn, it is conceivable that when an aggregated frame including a plurality of frames is to be generated, some control is performed, e.g., inserting four-octet control data called a delimiter between frames.

In practice, therefore, when the frame length of one frame and the maximum value of an allowable aggregated frame length (count) are determined in a given application, it is necessary to obtain a reference aggregated frame length (count) with respect to each transmission rate by calculating a throughput characteristic obtained by the combination of determined values, i.e., a characteristic like that shown in FIG. 2 or 3.

For example, as shown in FIGS. 2 and 3, the reference data storage unit 101 stores reference data indicating throughput characteristics with respect to transmission rates and aggregated frame lengths and the reference aggregated frame lengths determined with respect to the respective transmission rates.

Note that it suffices if the reference data stored in the reference data storage unit 101 include at least the reference aggregated frame lengths determined with respect to the respective transmission rates in FIGS. 2 and 3.

In addition, it suffices to set different reference aggregated frame lengths for the respective transmission rates or set one reference aggregated frame length for each group of a plurality of adjacent transmission rates.

It suffices to express the relationship between the respective transmission rates, reference aggregated frame lengths, and throughputs, like that shown in FIGS. 2 and 3, in the form of a table. For example, this relationship may be expressed by a table like that shown in FIG. 4. The control unit 10 stores such a table.

The relationship between transmission rates, aggregated frame lengths, and throughputs varies depending on the frame length of one frame. When a plurality of applications in which the length of one frame varies operate on the wireless communication apparatus in FIG. 1, the reference data storage unit 101 may store a plurality of reference data for the respective frame lengths (or the respective applications), like those indicating the relationships between transmission rates, aggregated frame lengths, and throughputs, like those shown in FIGS. 2 to 4. The wireless communication apparatus in FIG. 1 selectively uses the reference data in accordance with the application operating on the apparatus (or the frame length corresponding to the application).

The selecting unit 102 selects one of the plurality of transmission rates which the wireless communication apparatus in FIG. 1 has, and selects the frame length of an aggregated frame by referring to the reference data (e.g., the graphs of FIGS. 2 and 3 and the table of FIG. 4) stored in the reference data storage unit 101. The selecting unit 102 notifies the link adaptation control unit 103 and the frame aggregation unit 204 of the selected transmission rate and the selected aggregated frame length. The apparatus then starts trial communication at the selected transmission rate and with the selected aggregated frame length.

In this case, the wireless communication apparatus in FIG. 1 performs trial communication to determine whether it is possible to perform communication at the transmission rate and with the aggregated frame length, which are selected by the selecting unit 102, in order to determine the initial values of a transmission rate and an aggregated frame length at the start of communication, the maximum values of a transmission rate and a frame length used for control on a transmission rate/frame length afterward, or the maximum transmission rate notified to an AP in admission control (i.e., in order to set/re-set the initial values or maximum values of a transmission rate and an aggregated frame length).

If this trial communication result indicates that it is determined (by the channel variation determining unit 6) that it is possible to perform communication at the selected transmission rate and with the selected aggregated frame length, the apparatus determines the selected transmission rate and the selected aggregated frame length as initial values/maximum values, notifies the link adaptation control unit 103 of the transmission rate as an initial value/maximum value, and notifies the frame aggregation unit 204 of the aggregated frame length as an initial value.

The frame aggregation unit 204 generates an aggregated frame including a plurality of MAC frames generated by the frame generating unit 203 in accordance with the notified frame length, and outputs the resultant frame to the wireless transmission unit 2.

The link adaptation control unit 103 stores, in advance, a table indicating a plurality of transmission rates and modulation schemes and error correction coding schemes which are set for the respective transmission rates. The link adaptation control unit 103 then performs conventional link adaptation control by using the transmission rate notified as an initial value/maximum value from the selecting unit 102 as an initial value/maximum value. That is, the link adaptation control unit 103 selects an optimal transmission rate from the plurality of transmission rates in the table in accordance with a wireless channel state, reads out a modulation scheme and error correction coding scheme corresponding to the transmission rate from the table, and notifies the wireless transmission unit 2 of the new transmission rate, the modulation scheme, and the error correction coding scheme.

In addition, at the time of trial communication, the link adaptation control unit 103 notifies the wireless transmission unit 2 of a modulation scheme and error correction coding scheme corresponding to the transmission rate notified from the selecting unit 102. Furthermore, the link adaptation control unit 103 sets the transmission rate notified as an initial value/maximum value from the selecting unit 102 as an initial value at the start of communication or a maximum transmission rate notified to an AP in admission control.

The wireless transmission unit 2 codes and modulates the data of a frame (aggregated frame) input to the wireless transmission unit 2 in accordance with the modulation scheme and error correction coding scheme notified from the link adaptation control unit 103.

Processing operation for selecting a frame length and a transmission rate by the wireless communication apparatus in FIG. 1 (mainly the processing operation of the selecting unit 102) will be described next with reference to the flowchart shown in FIG. 5.

Figure 5:
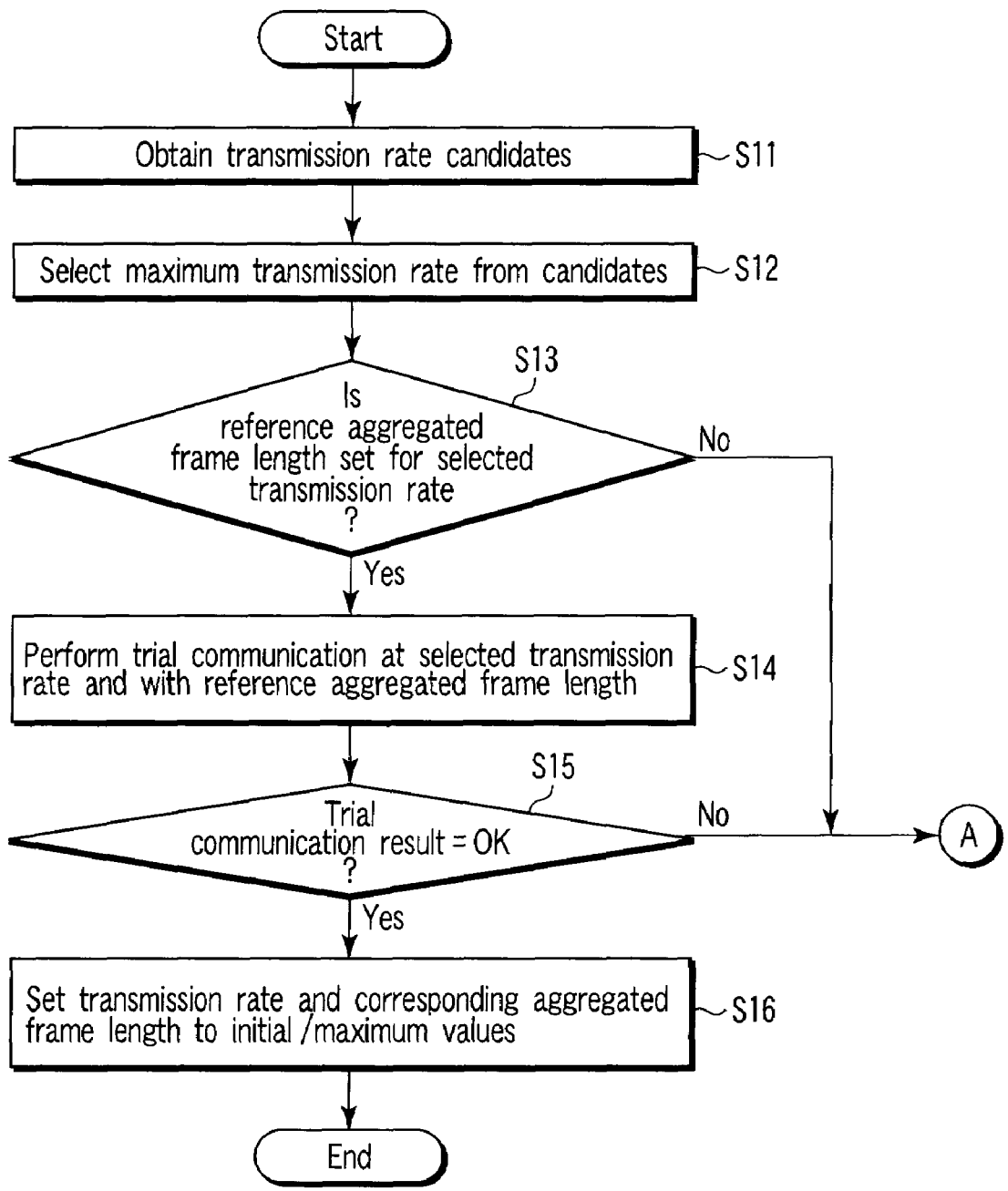
FIG. 5 is a flowchart for explaining processing operation for selecting a frame length and a transmission rate.

FIG. 5 will explain a case wherein the selecting unit 102 sequentially selects a plurality of transmission rate candidates which the wireless communication apparatus in FIG. 1 has, starting from the highest transmission rate.

First of all, the selecting unit 102 obtains, as a plurality of transmission rate candidates, all or some of usable transmission rates of the plurality of transmission rates stored in the table indicating predetermined modulation schemes and error correction coding schemes with respect to the respective transmission rates from the link adaptation control unit 103 (step S11). The selecting unit 102 then sequentially selects the plurality of obtained transmission rate candidates one by one in descending order (step S12).

If a reference aggregated frame corresponding to the transmission rate selected in step S12 is set for the reference data stored in the reference data storage unit 101 (step S13), the selecting unit 102 notifies the link adaptation control unit 103 and the frame aggregation unit 204 of the selected transmission rate (trial transmission rate) and the corresponding reference aggregated frame length (trial frame length) to perform trial communication at the selected transmission rate and with the reference aggregated frame length (step S14).

At the time of trial communication, the frame generating unit 203 may generate a trial MAC frame containing arbitrary data or trial data. The frame aggregation unit 204 generates a trial aggregated frame (a trial frame) including a plurality of trial MAC frames generated by the frame generating unit 203 in accordance with the notified trial frame length, and outputs the resultant frame to the wireless transmission unit 2.

The link adaptation control unit 103 notifies the wireless transmission unit 2 of a modulation scheme and error correction coding scheme corresponding to the trial transmission rate notified from the selecting unit 102. The wireless transmission unit 2 codes and modulates the data of the aggregated frame input to the wireless transmission unit 2 in accordance with the modulation scheme and error correction coding scheme notified from the link adaptation control unit 103.

In this manner, at the time of trial communication, the apparatus transmits an aggregated frame once or a plurality of number of times, and receives a response such as an ACK corresponding to each frame in the aggregated frame which is transmitted from the receiving side of the aggregated frame or a Block ACK corresponding to the overall aggregated frame.

The channel variation determining unit 6 calculates an error rate with respect to the overall aggregated frame or each frame in the aggregated frame by using the response such as the ACK corresponding to each frame in the aggregated frame or the Block ACK corresponding to the overall aggregated frame, which is obtained by the frame processing unit 202, and compares the calculated result with a threshold error rate to determine whether it is possible to perform communication at the trial transmission rate and with the trial frame length. If the calculated error rate is less than the threshold error rate, the channel variation determining unit 6 determines that it is possible to perform communication at the trial transmission rate and with the trial frame length. If the calculated error rate is equal to or more than the threshold error rate, the channel variation determining unit 6 determines that it is impossible to perform communication at the trial transmission rate and with the trial frame length (step S15).

If it is determined in step S15 that it is possible to perform communication at the trial transmission rate and with the trial frame length, the selecting unit 102 determines the transmission rate and the corresponding reference frame length as initial values/maximum values, notifies the link adaptation control unit 103 of the transmission rate as an initial value/maximum value, and notifies the frame aggregation unit 204 of the reference aggregated frame length as an initial value (step S16).

The frame aggregation unit 204 generates an aggregated frame including the plurality of MAC frames generated by the frame generating unit 203 by using the notified frame length, and outputs the resultant frame to the wireless transmission unit 2. The link adaptation control unit 103 performs the above link adaptation control by using the notified transmission rate as an initial value or a maximum transmission rate.

If it is determined in step S13 that a reference aggregated frame length is not set to the transmission rate selected in step S12, or if it is determined in step S15 that it is impossible to perform communication at the trial transmission rate and with the trial frame length, the apparatus performs processing operation for selecting another transmission rate and another aggregated frame length. This processing operation will be described later.

Note that the plurality of transmission rate candidates obtained in step S11 may be all the transmission rates specified by the IEEE802.11 specification or the like, e.g., four transmission rates in IEEE802.11b or eight transmission rates in IEEE802.11a. In addition, a plurality of transmission rate candidates may be only transmission rates, of the plurality of transmission rates specified by a specification, which is compulsory to use. Alternatively, it suffices to select different transmission rates for the respective applications and use only selected transmission rates as candidates. In either case, it suffices to perform trial transmission while changing the transmission rate on a frame basis without aggregating frames, and to determine the upper limit value of a transmission rate as a candidate on the basis of each transmission result (the presence/absence of ACK response to each transmitted frame).

For example, in step S11, the selecting unit 102 sequentially selects transmission rates one by one from a plurality of transmission rates provided in advance or some transmission rates of the plurality of transmission rates in descending order. When transmitting one frame at the selected transmission rate and receiving an ACK response to the frame, the apparatus determines that it can performs communication at the transmission rate, i.e., can use the transmission rate. In step S12, the selecting unit 102 selects the highest transmission rate among the transmission rates which are determined to be able to be used.

Assume that when performing trial communication in step S14, the apparatus may transmit data up to a reference aggregated frame length or may transmit an aggregated frame having a frame length (e.g., the number of frames obtained by adding a predetermined number of frames to the number of frames corresponding to the reference aggregated frame length) longer (larger) than the reference aggregated frame length.

As is obvious from in FIGS. 2 and 3, if an aggregated frame length is larger than the reference aggregated frame length, the apparatus may obtain a throughput higher than that when the frame length is equal to the reference aggregated frame length. Therefore, transmitting an aggregated frame having a frame length longer than the aggregated frame length makes it possible to determine whether it is possible to perform communication with a throughput higher than that when the frame length is equal to the reference aggregated frame length.

As described above, if the apparatus performs trial communication by using an aggregated frame having a frame length longer than the reference aggregated frame length in step S14, and determines as a result that it can perform communication at the frame length, it suffices to set the frame length as an initial value/maximum value in step S16 in step S5.

Assume that it is determined in step S15 that it is possible to perform communication at the trial transmission rate and with the trial frame length. In this case, if there is a frame length which can obtain a throughput higher than that obtained with the trial transmission rate and with the reference frame length, the selecting unit 102 may perform trial communication again by using the frame length as a new trial frame length. If it is determined as a result of the trial communication that it is possible to perform communication with the new trial frame length, the new trial frame length is set as an initial value/maximum value.

Second Embodiment

Another processing operation for selecting a frame length and a transmission rate will be described next with reference to the flowchart shown in FIG. 6. Note that the same reference numerals as in FIG. 5 denote the same parts in FIG. 6, and different portions will be described below. That is, step S12' in FIG. 6 replaces step S12 in FIG. 5, and steps S26 to S28 in FIG. 6 replace step S16 in FIG. 5.

In step S12 in FIG. 5, the selecting unit 102 selects the highest transmission rate among a plurality of transmission rate candidates. In contrast, in step S12' in FIG. 6, a selecting unit 102 selects a transmission rate at which communication can be actually performed from a plurality of transmission rate candidates.

If, for example, the maximum transmission rate among a plurality of transmission rate candidates is 104 MB/s, the selecting unit 102 selects a transmission rate of 52 Mb/s in step S12'. If the apparatus performs trial communication by using a transmission rate of 52 Mb/s and a corresponding reference aggregated frame length as a trial transmission rate and a trial frame length in step S14, and determines as a result that it can perform communication (steps S14 and S15), the process advances to step S26.

It is checked in step S26 whether there is another transmission rate which is higher than the current trial transmission rate, 52 Mb/s, and to which a reference aggregated frame length is set. If there is no such other transmission rate, the process advances to step S28 to determine the current trial transmission rate and the corresponding reference aggregated frame length as initial values/maximum values.

If it is determined in step S26 that there is another transmission rate which is higher than the current trial transmission rate and to which an aggregated frame length is set, the process returns to step S14 to select the another transmission rate and the corresponding reference aggregated frame length as a new trial transmission rate and a new trial frame length and perform trial communication. If it is determined as a result of the trial communication that it is possible to perform communication (steps S14 and S15), the process advances to step S26 again. The subsequent operation is the same as that described above.

If it is determined in step S13 that no reference aggregated frame length is set for the transmission rate selected in step S12', or it is determined in step S15 that it is impossible to perform communication at the trial transmission rate and with the trial frame length, the apparatus performs processing operation for selecting another transmission rate and another aggregated frame length. This processing operation will be described later.

A merit of the first embodiment is that since it searches a plurality of transmission rate candidates for the highest transmission rate, if it is possible to perform communication at the transmission rate and with the corresponding reference aggregated frame length, the processing is terminated. Unlike in the first embodiment, in the second embodiment, even if it is possible to perform communication at a given transmission rate and with a corresponding reference aggregated frame length, it is necessary to check the presence/absence of a transmission rate candidate higher than the transmission rate. However, if, for example, a given transmission rate near the transmission rate, 52 Mb/s, is marked a maximum or initial value and differs from the maximum value when viewed from a log, using the second embodiment makes it unnecessary to uselessly perform search starting from the maximum transmission rate with the lowest possibility for every operation.

As in the first embodiment, when the apparatus performs trial communication in step S14, it suffices to use a reference aggregated frame length as a trial frame length without any change or a frame length (e.g., the number of frames obtained by adding a predetermined number of frames to the number of frames corresponding to the reference aggregated frame length) longer (larger) than the reference aggregated frame length as a trial frame length.

Assume that the apparatus performs trial communication by using an aggregated frame length longer than the reference aggregated frame length as a trial frame length in step S14, and determines as a result that it can perform communication with the trial frame length. In this case, when the process advances from step S26 to step S28 in FIG. 6, it suffices to set this trial frame length as an initial value/maximum value in step S28.

In addition, as in the first embodiment, if it is determined in step S15 that it is possible to perform communication at a trial transmission rate and with a trial frame length, and there is a frame length with which the apparatus can obtain a throughput higher than that obtained with the trial transmission rate and the trial frame length, the selecting unit 102 may perform trial communication again by using the frame length as a new trial frame length. If it is determined as a result of the trial communication that it is possible to perform communication with the new trial frame length, the new trial frame length is set to an initial value/maximum value.

Third Embodiment

In the first and second embodiments, the reference data stored in the reference data storage unit 101 may include frame lengths other than reference aggregated frame lengths and information indicating the corresponding throughputs, together with the reference aggregated frame lengths, with respect to the respective transmission rates, as shown in, for example, FIG. 7.

Referring to FIG. 7, each column corresponds to a transmission rate (Mb/s), and each row represents a corresponding throughput (Mb/s). The numerical value in each cell represents the number of frames in an aggregated frame. In the columns corresponding to the respective transmission rates, some cells having encircled numerical values. These encircled numerical values represent reference aggregated frame lengths at the respective transmission rates.

Obviously from FIG. 7, if the number of frames at a transmission rate of 52 Mb/s is "4", the obtained throughput is 40 to 50 Mb/s.

Figure 6:
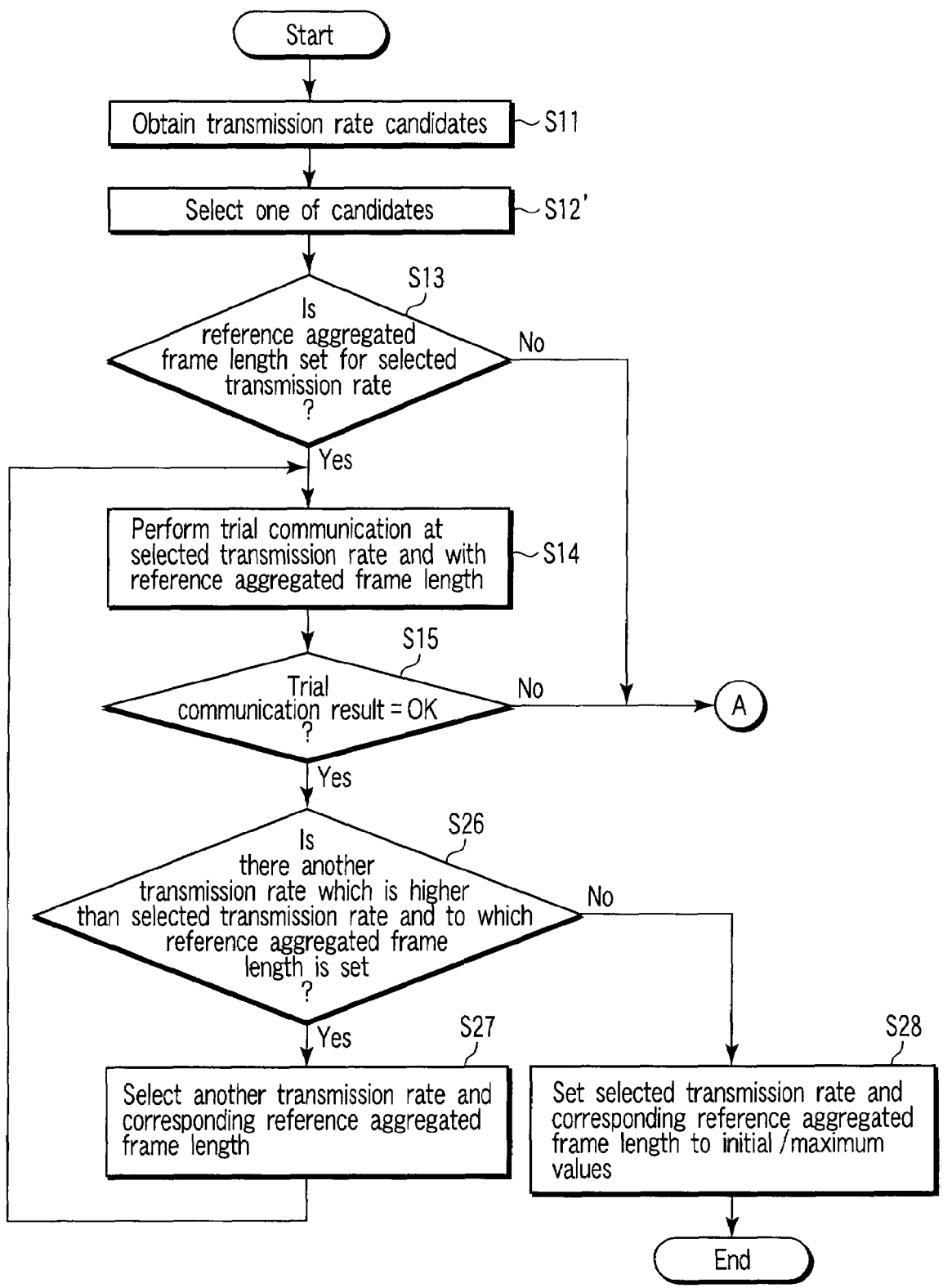
FIG. 6 is a flowchart for explaining another processing operation for selecting a frame length and a transmission rate.

In this manner, it suffices to store not only the relationship between reference aggregated frame lengths and corresponding throughputs but also the relationship between frame lengths other than the reference aggregated frame lengths and corresponding throughputs with respect to the respective transmission rates and to select, in the use of a transmission rate for which no reference aggregated frame length exists, an aggregated frame length with which the apparatus can obtain the maximum throughput at the transmission rate from the table in FIG. 7 instead of a reference aggregated frame length, in step S13 in FIGS. 5 and 6. In this case, it suffices to perform trial communication with the selected frame length in step S14.

Depending on a transmission rate, increasing an aggregated frame length may make it possible to obtain a throughput higher than that with a reference aggregated frame length. For example, referring to FIG. 7, at a transmission rate of 104 Mb/s, the threshold with a reference aggregated frame count of "5" is 70 to 80 Mb/s, whereas a higher throughput can be obtained if it is possible to perform communication with an aggregated frame count of "8".

In step S14 in FIG. 5 described in, for example, the first embodiment, performing trial communication at the selected transmission rate and with a frame length longer than the reference aggregated frame length (a transmission rate of 104 Mb/s and an aggregated frame count of "8" in FIG. 7) makes it unnecessary to perform trial communication again afterward and hence to obtain the initial values/maximum values of a transmission rate and aggregated frame length with which a higher throughput can be obtained.

Note that the throughputs obtained with frame lengths other than reference aggregated frame lengths at the respective transmission rates may be stored in the form shown in FIG. 7. Alternatively, every time the apparatus performs trial communication at a given transmission rate and with a corresponding frame length, the corresponding throughput may be stored in a table like that shown in FIG. 7.

Fourth Embodiment

Assume the following cases: (a) it is determined in step S13 in FIG. 5 that no reference aggregated frame length is set for the transmission rate selected in step S12; (b) it is determined in step S15 in FIG. 5 that it is impossible to perform communication at a trial transmission rate and with a trial frame length; (c) it is determined in step S13 in FIG. 6 that no reference aggregated frame length is set for the transmission rate selected in step S12'; and (d) it is determined in step S15 in FIG. 6 that it is impossible to perform communication at a trial transmission rate and with a trial transmission length. In each of these cases, the apparatus performs processing operation for selecting another transmission rate and another aggregated frame length.

The fourth embodiment will exemplify the processing operation for selecting another transmission rate and another aggregated frame length in the above four cases, i.e., if it is impossible to perform communication with the currently selected combination of transmission rate and aggregated frame length.

Figure 8:
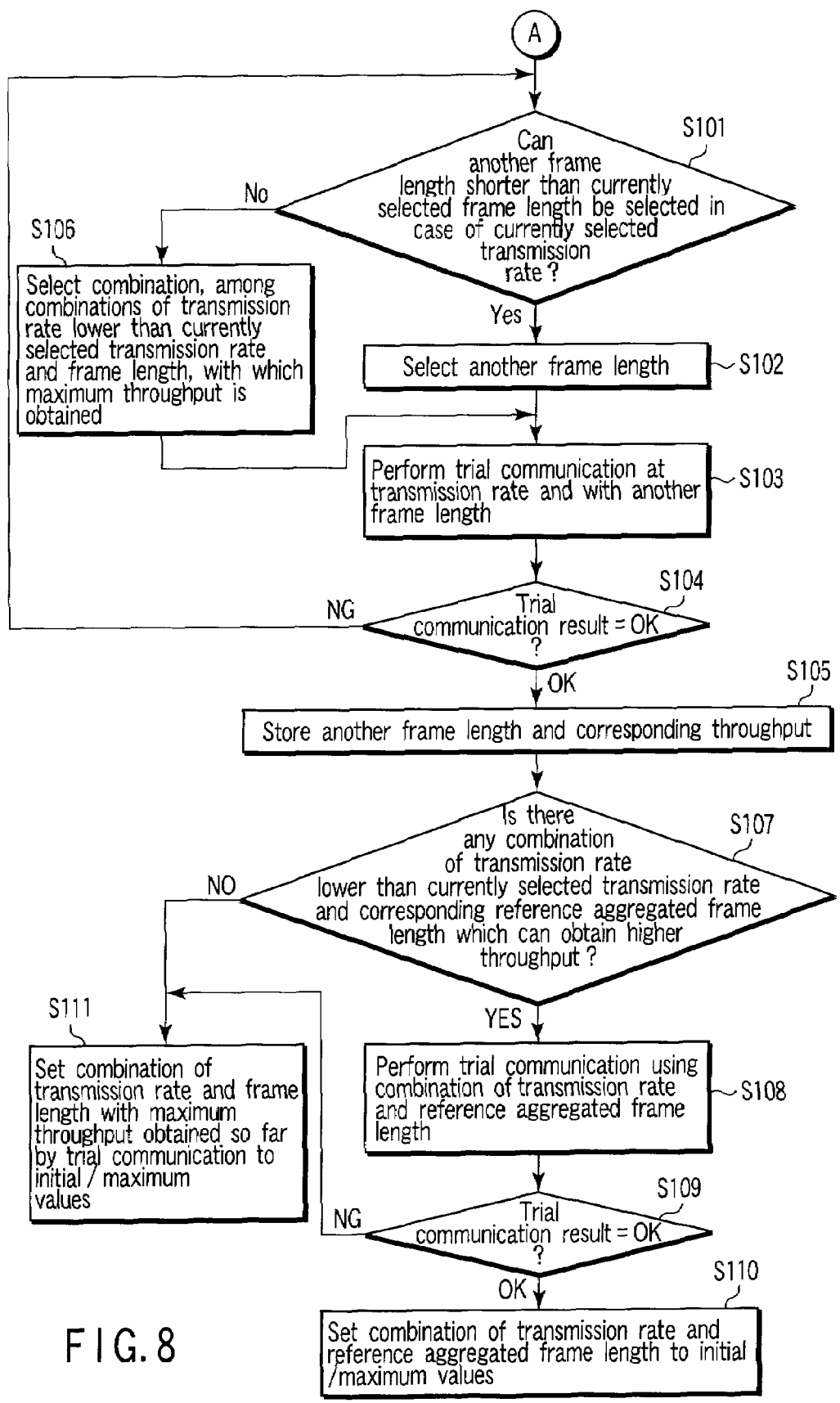
FIG. 8 is a flowchart for explaining processing operation for selecting a frame length and a transmission rate, which follows the processing shown in FIGS. 5 and 6.

This operation will be described with reference to the flowchart of FIG. 8.

If it is impossible to perform communication with the currently selected combination of transmission rate and aggregated frame length (e.g., a reference aggregated frame length), it is checked first whether there is any aggregated frame length with which communication can be performed at the same transmission rate (step S101).

Assume that when the apparatus performed trial communication with the currently selected combination of transmission rate and aggregated frame length (e.g., 10 frames) (step S14 in FIGS. 5 and 6), the apparatus could receive ACK responses to the first to seventh frames in the aggregated frame but could not receive any responses to the eighth and subsequent frames. In this case, if the aggregated frame length is seven frames, the channel variation determining unit 6 should determine that it is possible to perform communication. A selecting unit 102 therefore receives, from the channel variation determining unit 6, information indicating up to which frame in the aggregated frame the apparatus has received an ACK response or information indicating to which frames in the aggregated frame the apparatus has received ACK responses. In step S101, the selecting unit 102 then selects "7" frames as a new aggregated frame length or a value smaller than "7" on the basis of the position of the frame in the aggregated frame to which the apparatus has received an ACK response.

Assume that the channel variation determining unit 6 has output information about the error rate of the overall aggregated frame as a result of performing trial communication with the currently selected combination of transmission rate and aggregated frame length (e.g., 10 frames). In this case, the apparatus gradually decreases the currently selected aggregated frame length every predetermined frame length (count). Alternatively, the apparatus decreases the currently selected aggregated frame length on the basis of a predetermined frame length to be reduced (a frame count to be reduced) in accordance with an error rate. If, for example, the error rate is 50%, the apparatus decreases the frame length every two frames at a time. If the error rate is 30%, the apparatus decreases the frame length every frame at a time. In addition, if the reference data storage unit 101 stores in advance throughputs with respect to the numbers of frames of aggregated frames for the respective transmission rates in the form of a table like that shown in FIG. 7, it suffices to refer to the table to select a frame length which can obtain the highest throughput next to that obtained with the currently selected frame length.

In this manner, if it is determined in step S101 that a new aggregated frame length can be selected with respect to the currently selected transmission rate, the selecting unit 102 selects the new frame length (step S102). The process then advances to step S103.

In step S103, the apparatus performs trial communication using the combination of transmission rate and new aggregated frame length. If it is determined as a result of the trial communication that it is possible to perform communication using the combination (step S104), the apparatus temporarily stores the corresponding throughput (step S105). For example, it suffices to record the throughput corresponding to the combination of transmission rate and aggregated frame length on a table like that shown in FIG. 7.

If it is determined in step S101 that the currently selected aggregated frame length cannot be decreased at the currently selected transmission rate, the process advances to step S106.

In step S106, the selecting unit 102 selects, for example, one of the combinations of transmission rates lower than the currently selected transmission rate and aggregated frame lengths, in the table shown in FIG. 7, which can obtain the maximum throughput (step S106). The process then advances to step S103. Subsequently, in the above manner, the apparatus performs trial communication with the selected combination and checks whether it can perform communication using the combination. Upon determining that it is possible to perform communication, the apparatus temporarily stores the corresponding throughput (step S105).

After the processing in steps S101 to S105 (or the processing from step S101 to step S105 through step S106), the process advances to step S107.

In step S107, the selecting unit 102 checks by referring to, for example, the table in FIG. 7, whether there is any combination of transmission rate lower than the currently selected transmission rate and corresponding reference aggregated frame length which can obtain a throughput higher than the maximum throughput obtained in the trial communication performed so far. If there is such a combination, the process advances to step S108 to check whether it is possible to perform communication using the combination.

Assume that the currently selected transmission rate and aggregated frame length are 104 Mb/s and two frames, respectively, and it is determined in step S104 that it is possible to perform communication using the combination, with the corresponding throughput being 50 to 60 Mb/s. Assume that in step S105, the apparatus stores the combination of transmission rate and aggregated frame length and throughput in the form shown in FIG. 7. In this case, as shown in FIG. 7, since a transmission rate of 78 Mb/s and a reference aggregated frame length of "6" allow to obtain a higher throughput, the selecting unit 102 selects the combination of a transmission rate of 78 Mb/s and a reference aggregated frame length of "6". In step S108, the apparatus performs trial communication using this combination.

If it is determined as a result of the trial communication that it is possible to perform communication using this combination (step S109), the selecting unit 102 sets the transmission rate and corresponding reference aggregated frame length of the combination to initial values/maximum values (step S10).

If it is determined in step S109 as a result of the trial communication that it is impossible to perform communication using the combination, or it is determined in step S107 that there is no combination of transmission rate and corresponding reference aggregated frame length which can obtain a throughput higher than the maximum throughput obtained in the trial communication performed so far, the process advances to step S111.

In step S111, the selecting unit 102 sets the combination of transmission rate and aggregated frame length which has allowed to obtain the maximum throughput in the trial communication performed so far to initial values/maximum values. That is, the selecting unit 102 sets the combination of transmission rate and aggregated frame length temporarily stored in step S105 to initial values/maximum values.

Fifth Embodiment

Figure 9:
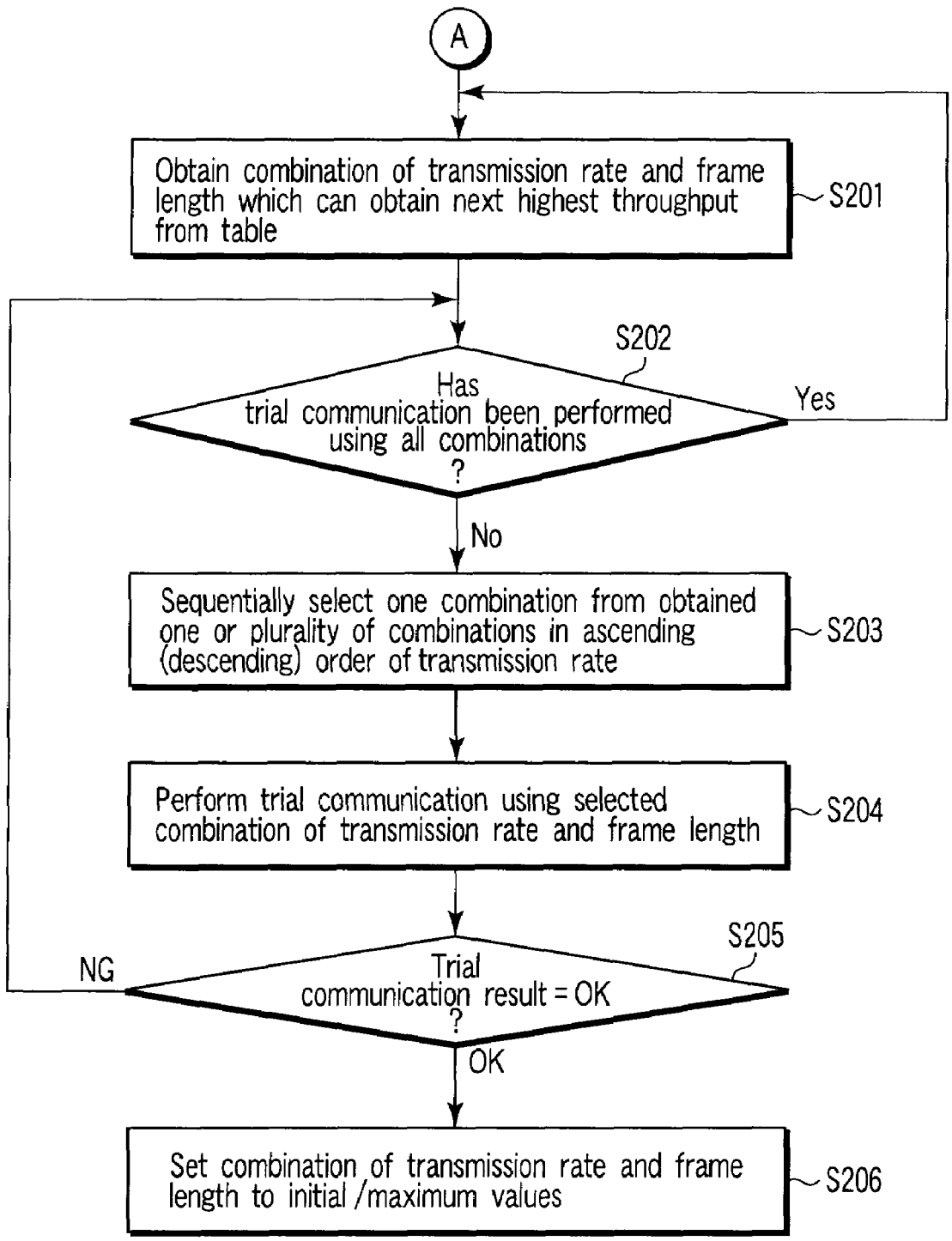
FIG. 9 is a flowchart for explaining another processing operation for selecting a frame length and a transmission rate, which follows the processing shown in FIGS. 5 and 6.

The fifth embodiment will exemplify another processing operation for, when it is impossible to perform communication with the currently selected combination of transmission rate and aggregated frame length, selecting another combination of transmission rate and aggregated frame length in FIGS. 5 and 6 by referring to the flowchart shown in FIG. 9.

Referring to FIG. 9, if it is impossible to perform communication using the currently selected combination of transmission rate and aggregated frame length (e.g., reference aggregated frame length), the apparatus sequentially performs trial communication using combinations of transmission rates and aggregated frame lengths stored in the table shown in FIG. 7 in descending order of throughput.

A reference data storage unit 101 stores a table indicating the throughputs obtained with reference aggregated frame lengths and frame lengths other than the reference aggregated frame lengths with respect to the respective transmission rates. Alternatively, every time the apparatus performs trial communication, the table in FIG. 7 may be updated with the used combination of transmission rate and aggregated frame length and the corresponding throughput.

First of all, if it is determined in step S02 that it is impossible to perform communication using the currently selected combination of transmission rate and aggregated frame length in FIGS. 5 and 6, a selecting unit 102 reads, from the combinations of transmission rates and aggregated frame lengths stored in the table shown in FIG. 7, a combination of transmission rate and frame length which can obtain the highest throughput next to the throughput obtained with the currently selected combination of transmission rate and aggregated frame length.

Assume that in the case shown in FIG. 7, it is impossible to perform communication at a transmission rate of 104 Mb/s and with a reference aggregated frame length of "5". In this case, two candidate combinations, i.e., a combination of a transmission rate of 78 Mb/s and an aggregated frame length of "6" and the combination of a transmission rate of 104 Mb/s and an aggregated frame length of "3", are obtained in step S201 as candidate combinations which cannot obtain a throughput of 70 to 80 Mb/s, which can be obtained by the above combination, but can obtain a throughput of 60 to 70 Mb/s lower than it by one rank.

The selecting unit 102 then sequentially selects one or a plurality of combinations each including a transmission rate and a frame length, in ascending or descending order of the transmission rate (step S203).

If, for example, the above two candidate combinations are obtained, the selecting unit 102 selects first a combination of a transmission rate of 104 Mb/s and a frame length of "3" in step S203 when the apparatus sequentially performs trial communication in descending order of transmission rate. In addition, if the above two candidate combinations are obtained, the selecting unit 102 selects the combination of a transmission rate of 78 Mb/s and a frame length of "6" in step S203 when the apparatus sequentially performs trial communication in ascending order of transmission rate.

In step S204, the apparatus performs trial communication using the combination selected in step S203. If it is determined as a result of this trial communication that it is possible to perform communication using the combination, the process advances to step S206 to set the transmission rate and frame length of the combination to initial values/maximum values.

If it is determined as a result of this trial communication using the combination selected in step S203 that it is impossible to perform communication using the combination, the process returns to step S202 to select another unselected combination (step S203). Subsequently, the same operation as that described above is performed.

If it is determined in step S202 as a result of trial communication using each combination read in step S201 that the selecting unit 102 could obtain no combination which allows communication, the process returns to step S201. The selecting unit 102 then reads a combination of transmission rate and frame length which can obtain a higher throughput from the plurality of combinations stored in the stable in FIG. 7. Subsequently, the same operation as that described above is performed.

Referring to FIG. 9, if it is impossible to perform communication with the initial combination of transmission rate and frame length, the selecting unit 102 checks first how many combinations of transmission rates and frame lengths exist, which can obtain a throughput lower than the throughput obtained with the initial combination by one rank. If there is only one such combination, it suffices to perform communication using the combination. If there are a plurality of such combinations, the selecting unit 102 sequentially selects the combinations one by one in descending or ascending order of transmission rate, and the apparatus performs trial communication to check whether it can perform communication.

The fifth embodiment undergoes switching of transmission rates more frequently than the fourth embodiment. However, the fifth embodiment always sequentially performs trial communication using combinations of transmission rates and frame lengths in descending order of throughput.

As has been described above, the first to fifth embodiments can select a transmission rate and the number of frames in an aggregated frame which can obtain the maximum throughput in the current channel state.

Note that the techniques of the present invention which have been described in the embodiments of the present invention can be distributed as computer-executable programs by being stored in recoding media such as magnetic disks (flexible disks, hard disks, and the like), optical disks (CD-ROMs, DVDs, and the like), and semiconductor memories.

What is claimed is:

1. A wireless communication apparatus comprising:
a memory to store reference data including a plurality of transmission rates usable for transmission of an aggregated frame including a plurality of frames and a plurality of reference frame lengths of the aggregated frame corresponding to the transmission rates, respectively, a throughput obtained with one of the transmission rates and a reference frame length of the reference frame lengths which corresponds to the one of the transmission rates is higher than any throughputs obtained with any frame length at another transmission rate lower than the one of the transmission rates;
a selecting unit configured to select one or more trial transmission rates among the transmission rates and one or more trial frame lengths among the reference frame lengths and frame lengths other than the reference frame lengths;
a transmission unit configured to transmit a trial aggregated frame with one of the trial transmission rates selected by the selecting unit, a frame length of the trial aggregated frame corresponding to one of the trial frame lengths selected by the selecting unit;
a reception unit configured to receive a response corresponding to the trial aggregated frame transmitted;
a determining unit configured to determine whether communication with the one of the trial transmission rates and the one of the trial frame lengths is possible or not, based on the response received; and
a control unit configured to set the one of the trial transmission rates and the one of the trial frame lengths, with which the communication is determined to be possible, to one of an initial value and a maximum value of a transmission rate for transmitting the aggregated frame and a frame length of the aggregated frame, respectively.

2. The apparatus according to claim 1, wherein the selecting unit selects a highest transmission rate among the transmission rates as one of the trial transmission rates.

3. The apparatus according to claim 1, wherein
the selecting unit selects one of the transmission rates and a corresponding reference frame length as a first trial transmission rate and a first trial frame length, respectively,
when the determining unit determines that communication with the first trial transmission rate and the first trial frame length is possible, the selecting unit selects a second trial transmission rate higher than the first trial transmission rate and a corresponding reference frame length as a second trial frame length, and
when the determining unit determines that communication with the second trial transmission rate and the second trial frame length is possible, the control unit sets the second transmission rate and the second frame length to one of the initial value and the maximum value.

4. The apparatus according to claim 1, wherein the reference data includes, for each of the transmission rates, the reference frame length and a throughput obtained with the reference frame length.

5. The apparatus according to claim 1, wherein the reference data includes, for each of the transmission rates, the reference frame length, a throughput obtained with the reference frame length, another frame length of the aggregated frame, and a throughput obtained with the another frame length.

6. The apparatus according to claim 5, wherein
the selecting unit selects one of the transmission rates and a corresponding reference frame length as a first trial transmission rate and a first trial frame length, respectively,
when the determining unit determines that communication with the first trial transmission rate and the first trial frame length is impossible, the selecting unit selects a second trial frame length shorter than the first trial frame length,
when the determining unit determines that communication with the first trial transmission rate and the second trial frame length is possible, the selecting unit selects a second trial transmission rate lower than the first trial transmission rate and a corresponding reference frame length as a third trial frame length, a throughput obtained with the second trial transmission rate and the third trial frame length being higher than a throughput obtained with the first trial transmission rate and the second trial frame length,
when the determining unit determines that communication with the second trial transmission rate and the third trial frame length is possible, the control unit sets the second trial transmission rate and the third trial frame length to one of the initial value and the maximum value.

7. The apparatus according to claim 6, wherein the control unit sets the first trial transmission rate and the second trial frame length to one of the initial value and the maximum value, when the determining unit determines that communication with the second trial transmission rate and the third trial frame length is impossible.

8. The apparatus according to claim 6, wherein the selecting unit selects the second trial frame length shorter than the first trial frame length by a predetermined number of frames.

9. The apparatus according to claim 6, wherein the selecting unit selects the second trial frame length based on a frame included in the first trial frame, the frame to which ACK response was obtained.

10. The apparatus according to claim 5, wherein
the selecting unit selects one of the transmission rates and a corresponding reference frame length as a first trial transmission rate and a first trial frame length, respectively,
when the determining unit determines that communication with the first trial transmission rate and the first trial frame length is impossible, the selecting unit selects a second trial transmission rate among the transmission rates and selects a second trial frame length, a throughput obtained with the second trial transmission rate and the second trial frame length being lower than a throughput obtained with the first trial transmission rate and the first trial frame length, when the determining unit determines that communication with the second trial transmission rate and the second trial frame length is possible, the control unit sets the second trial transmission rate and the second trial frame length to one of the initial value and the maximum value.

11. The apparatus according to claim 10, wherein when the determining unit determines that communication with the second trial transmission rate and the second trial frame length is impossible, the selecting unit selects a third trial transmission rate among the transmission rates and selects a third trial frame length, a throughput obtained with the third trial transmission rate and the third trial frame length being lower than a throughput obtained with the second trial transmission rate and the second trial frame length, when the determining unit determines that communication with the third trial transmission rate and the third trial frame length is possible, the control unit sets the third trial transmission rate and the third trial frame length to one of the initial value and the maximum value.

12. The apparatus according to claim 1, wherein the selecting unit selects one of the transmission rates and a corresponding reference frame length as a first trial transmission rate and a first trial frame length, respectively, when the determining unit determines that communication with the first trial transmission rate and the first trial frame length is impossible, the selecting unit selects a second trial frame length shorter than the first trial frame length, when the determining unit determines that communication with the first trial transmission rate and the second trial frame length is possible, the control unit sets the first trial transmission rate and the second trial frame length to one of the initial value and the maximum value.

13. The apparatus according to claim 12, wherein the selecting unit selects the second trial frame length shorter than the first trial frame length by a predetermined number of frames.

14. The apparatus according to claim 12, wherein the selecting unit selects the second trial frame length based on a frame included in the first trial frame, the frame to which ACK response was obtained.

15. The apparatus according to claim 1, wherein the frame length of the trial aggregated frame is longer than corresponding trial frame length.

16. The apparatus according to claim 1, wherein the selecting unit selects one of the transmission rates and a corresponding reference frame length as a first trial transmission rate and a first trial frame length, respectively, when the determining unit determines that communication with the first trial transmission rate and the first trial frame length is possible, the selecting unit selects a second trial frame length longer than the first trial frame length, a throughput obtained with the first trial transmission rate and the second trial frame length being higher than a throughput obtained with the first trial transmission rate and the first trial frame length, when the determining unit determines that communication with the first trial transmission rate and the second trial frame length is possible, the control unit sets the first trial transmission rate and the second trial frame length to one of the initial value and the maximum value.

17. A transmission control method for transmitting an aggregated frame including a plurality of frames, the method comprising:

storing, in a memory, reference data including a plurality of transmission rates usable for transmission of an aggregated frame including a plurality of frames and a plurality of reference frame lengths of the aggregated frame corresponding to the transmission rates, respectively, a throughput obtained with one of the transmission rates and a reference frame length of the reference frame lengths which corresponds to the one of the transmission rates is higher than any throughputs obtained with any frame length at another transmission rate lower than the one of the transmission rates;

selecting, in a selection unit, one or more trial transmission rates among the transmission rates and one or more trial frame lengths among the reference frame lengths and frame lengths other than the reference frame lengths;

transmitting, using a transmission unit, a trial aggregated frame with one of the trial transmission rates selected, a frame length of the trial aggregated frame corresponding to one of the trial frame lengths selected;

receiving, using a reception unit, a response corresponding to the trial aggregated frame transmitted;

determining, in a determining unit, whether communication with the one of the trial transmission rates and the one of the trial frame lengths is possible or not, based on the response received; and setting the one of the trial transmission rate and the one of the trial frame length, with which the communication is determined to be possible, to one of an initial value and a maximum value of a transmission rate for transmitting the aggregated frame and a frame length of the aggregated frame, respectively.

18. The method according to claim 17, wherein the selection unit selects a highest transmission rate among the transmission rates as one of the trial transmission rate.

19. The method according to claim 17, wherein the selection unit selects one of the transmission rates and a corresponding reference frame length as a first trial transmission rate and a first trial frame length, respectively, and selects another transmission rate higher than the first trial transmission rate and a corresponding reference frame length as a second trial transmission rate and a second trial frame length, respectively, and when the determining unit determines that communication with the first trial transmission rate and the first trial frame length is possible and communication with the second trial transmission rate and the second trial frame length is possible, the setting sets the second transmission rate and the second frame length to one of the initial value and the maximum value.

20. The method according to claim 17, wherein the selection unit selects one of the transmission rates and a corresponding reference frame length as a first trial transmission rate and a first trial frame length, respectively, and selects a second trial frame length shorter than the first trial frame length, and when the determining unit determines that communication with the first trial transmission rate and the first trial frame length is impossible and communication with the first trial transmission rate and the second trial frame length is possible, the setting sets the first transmission rate and the second frame length to one of the initial value and the maximum value.

* * * * *